United States Patent
Marcone et al.

(10) Patent No.: US 12,342,388 B2
(45) Date of Patent: Jun. 24, 2025

(54) RO DROPPING AND RA-RNTI CALCULATION

(71) Applicant: NOKIA TECHNOLOGIES OY, Espoo (FI)

(72) Inventors: Alessio Marcone, Munich (DE); Nhat-Quang Nhan, Reims (FR); Amir Mehdi Ahmadian Tehrani, Munich (DE); Marco Maso, Issy les Moulineaux (FR); Leonardo Chiarello, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/920,087

(22) Filed: Oct. 18, 2024

(65) Prior Publication Data

US 2025/0048440 A1    Feb. 6, 2025

Related U.S. Application Data

(63) Continuation of application No. PCT/EP2024/050527, filed on Jan. 11, 2024.
(Continued)

(51) Int. Cl.
H04W 74/0833        (2024.01)

(52) U.S. Cl.
CPC .............. H04W 74/0833 (2013.01)

(58) Field of Classification Search
CPC ........... H04W 74/0833; H04W 74/006; H04W 74/002
See application file for complete search history.

(56) References Cited

U.S. PATENT DOCUMENTS

2023/0007702 A1* 1/2023 Park ................... H04L 5/0094
2023/0037998 A1* 2/2023 Lin ..................... H04W 74/006
(Continued)

FOREIGN PATENT DOCUMENTS

WO        2022/120568 A1    6/2022
WO    WO-2023191372 A1 * 10/2023 ............... H04L 1/08

OTHER PUBLICATIONS

International Search Report and Written Opinion dated Apr. 15, 2024 corresponding to International Patent Application No. PCT/EP2024/050527.

*Primary Examiner* — Chuong M Nguyen
(74) *Attorney, Agent, or Firm* — SQUIRE PATTON BOGGS (US) LLP

(57) ABSTRACT

Example embodiments of the present disclosure relate to methods, devices, apparatuses and computer readable storage medium for Random Access Channel (RACH) occasion (RO) dropping. In a method, a device determines a set of valid random access channel occasions (ROs) for a physical random access channel (PRACH) transmission with preamble repetitions. The device determines that the PRACH transmission is to be dropped in at least one RO of the set of valid ROs. The device determines one or more ROs of the set of valid ROs for calculation of a random access radio network temporary identifier (RA-RNTI), the one or more ROs for calculation of the RA-RNTI are not conditioned to whether the corresponding PRACH transmission over the one or more ROs is to be dropped. Then the device calculates the RA-RNTI based on the determined one or more ROs of the set of valid ROs.

20 Claims, 7 Drawing Sheets

Related U.S. Application Data

(60) Provisional application No. 63/494,291, filed on Apr. 5, 2023.

(56) References Cited

U.S. PATENT DOCUMENTS

| | | | |
|---|---|---|---|
| 2023/0156798 A1* | 5/2023 | Wang | H04W 74/0866 |
| | | | 370/329 |
| 2023/0362980 A1* | 11/2023 | Yan | H04B 7/18563 |
| 2024/0121829 A1* | 4/2024 | Zhang | H04W 74/006 |

\* cited by examiner

RO DROPPING AND RA-RNTI CALCULATION

CROSS-REFERENCE TO RELATED APPLICATION

This application is a Continuation of International Patent Application No. PCT/EP2024/050527, filed Jan. 11, 2024, which claims priority from U.S. Provisional Application No. 63/494,291, filed Apr. 5, 2023, the contents of which are hereby incorporated by reference in their entirety.

FIELDS

Various example embodiments of the present disclosure generally relate to the field of telecommunication and in particular, to methods, devices, apparatuses and computer readable storage medium for Random Access Channel (RACH) occasion (RO) dropping and Random Access Radio Network Temporary Identifier (RA-RNTI) calculation.

BACKGROUND

In the fifth generation (5G) New Radio (NR), several contention based random access (CBRA) procedures are supported, for example a 4-step RACH in Release 15 (Rel-15) and a 2-step RACH in Rel-16. Time-domain resources for RACH occasions (ROs) may be RRC configured. With the configuration, user equipment (UE) may determine a preamble format for a Physical Random Access Channel (PRACH) and applies a predefined or specified procedure to find the ROs in the time domain. In a frequency domain, an offset of the lowest RO and the number of multiplexed ROs for each time instance may be indicated. The number of occupied resource blocks per RO, represented in number of resource blocks (RBs) for a Physical Uplink Shared Channel (PUSCH), is predefined or specified, depending on the configured preamble length and sub-carrier spacings for PRACH and PUSCH.

A mapping of synchronization signal block (SSB) indexes to the determined ROs is derived by a UE to understand which ROs are associated to the selected SSB index before the start of the RACH procedure. The different SSB indexes are beamformed in different directions in a cell, hence selection of a wrong SSB index may entail a failure of the RACH procedure.

SUMMARY

In a first aspect of the present disclosure, there is provided a method. The method comprises: at a first device, determining, based on at least one condition being met, that a first Physical Random Access Channel (PRACH) transmission is to be dropped in a first Random Access Channel (RACH) occasion (RO) of an RO group; and transmitting at least one second PRACH transmission other than the first PRACH transmission to be dropped in ROs of the RO group.

In a second aspect of the present disclosure, there is provided a method. The method comprises: at a second device, determining, based on at least one condition being met, that a first Physical Random Access Channel (PRACH) transmission is to be dropped by a first device in a first Random Access Channel (RACH) occasion (RO) of an RO group; and receiving, from the first device, at least one second PRACH transmission other than the first PRACH transmission to be dropped in ROs of the RO group.

In a third aspect of the present disclosure, there is provided a method. The method comprises: determining a set of valid random access channel occasions (ROs) for a physical random access channel (PRACH) transmission with preamble repetitions; determining that the PRACH transmission is to be dropped in at least one RO of the set of valid ROs; determining one or more ROs of the set of valid ROs for calculation of a random access radio network temporary identifier (RA-RNTI), wherein the one or more ROs for calculation of the RA-RNTI are not conditioned to whether the corresponding PRACH transmission over the one or more ROs is to be dropped; and calculating the RA-RNTI based on the determined one or more ROs of the set of valid ROs.

In a fourth aspect of the present disclosure, there is provided an apparatus. The apparatus comprises at least one processor; and at least one memory storing instructions that, when executed by the at least one processor, cause the apparatus to perform the method according to the first aspect, the second aspect, or the third aspect.

In a fifth aspect of the present disclosure, there is provided an apparatus. The first apparatus comprises means for performing the method according to the first aspect, the second aspect, or the third aspect.

In a sixth aspect of the present disclosure, there is provided a computer readable medium. The computer readable medium comprises instructions stored thereon for causing an apparatus to perform the method according to the first aspect, the second aspect, or the third aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
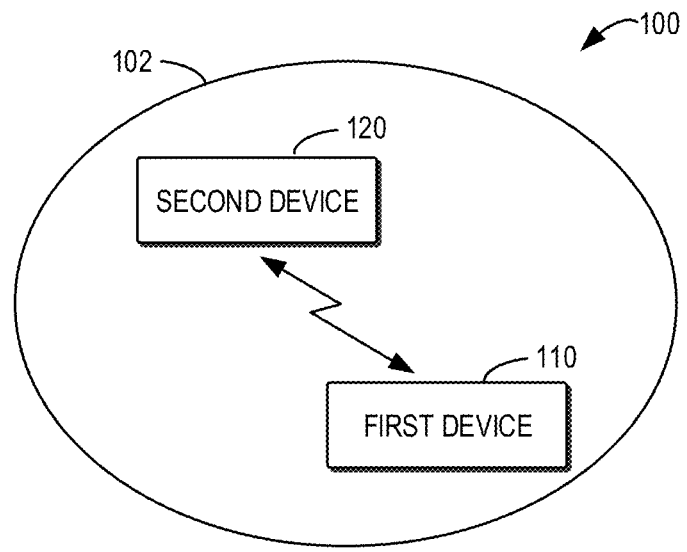
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

hardware-only circuit implementations (such as implementations in only analog and/or digital circuitry) and combinations of hardware circuits and software, such as (as applicable):

a combination of analog and/or digital hardware circuit(s) with software/firmware and any portions of hardware processor(s) with software (including digital signal processor(s)), software, and memory(ies) that work together to cause an apparatus, such as a mobile phone or server, to perform various functions) and hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

For CBRA procedures supported in 5G NR, a time-domain resource for ROs may be RRC configured, for example, by prach-ConfigurationIndex (in rach-ConfigGeneric). The prach-ConfigurationIndex acts as an indicator to a row of a table predefined or specified. With the parameters indicated by prach-ConfigurationIndex, the terminal device determines the preamble format for PRACH and applies the predefined or specified procedure specified to find the ROs in the time domain.

In the frequency domain, parameters msg1-FrequencyStart and msg1-FDM configured in RACH-ConfigGeneric indicate the offset of the lowest RO in frequency domain and the number of ROs multiplexed in frequency domain for each time instance, respectively. The number of occupied resource blocks per RO, expressed in number of RBs for PUSCH, is predefined or specified, depending on the configured preamble length and sub-carrier spacings for PRACH and PUSCH.

In some mechanisms, a mapping of SSB indexes to the determined ROs is derived by a terminal device to understand which ROs are associated to the SSB index selected during the preliminary step before the start of the RACH procedure. The different SSB indexes are beamformed in different directions in the cell, hence selection of a wrong SSB index may entail failure of the RACH procedure.

In some mechanisms, one parameter ssb-perRACH-OccasionAndCB-PreamblesPerSSB is configured in RACH-ConfigCommon and indicates two information: (i) the number of SSB indexes per RO and (ii) the number of contention-based preambles per SSB index. Once this information is available to a terminal device, the terminal device maps the SSB indexes to the time-frequency grid of ROs (determined as described above) in increasing order of frequency resource indices, time resource indices of the ROs within a PRACH slots, and the PRACH slots, sequentially.

In some mechanisms, any terminal device attempting access selects one RO out of the one or more ROs associated to the selected SSB beam to perform Msg1 transmission or to transmit its preamble. Upon the detection of a preamble, the combination between preamble identity (ID) such as a random access preamble ID (RAPID) and RO over which the preamble is transmitted provides a network device two elements. The network device uses these two elements to both determine that an access attempt is occurring and design the corresponding response to the preamble detection. The response comes in the form of a Msg2 RA response (RAR).

The Msg2 RAR includes the uplink (UL) grant which schedules the Msg3 transmission, and is carried in a physical downlink shared channel (PDSCH) scheduled by downlink control information (DCI) with cyclic redundancy check (CRC) scrambled by a bit string called Random Access Radio Network Temporary Identifier (RA-RNTI). The RA-RNTI is generated according to a predefined specification. More precisely, the RA-RNTI value is calculated as a function of the PRACH occasion over which the network device has correctly detected one or more preambles, as follows (1):

$$RA\text{-}RNTI = 1 + s\_id + 14 \times t\_id + 14 \times 80 \times f\_id + 14 \times 80 \times 8 \times ul\_carrier\_id \qquad (1)$$

where s_id is the index of the first orthogonal frequency division multiplexing (OFDM) symbol of the physical random access channel (PRACH) occasion ($0 \leq s\_id < 14$), t_id is the index of the first slot of the PRACH occasion in a system frame ($0 \leq t\_id < 80$). The subcarrier spacing to determine t_id is based on the value of µ which is predefined or specified for µ={0, 1, 2, 3}, and for µ={5, 6}. f_id is the index of the PRACH occasion in the frequency domain ($0 \leq f\_id < 8$), and ul_carrier_id is the UL carrier used for Random Access Preamble transmission (0 for normal uplink (NUL) carrier, and 1 for supplementary uplink (SUL) carrier).

In other words, the RA-RNTI is an indication for the terminal device to understand if the content of the Msg2 RAR is of any interest. If the content of the Msg2 RAR is of interest, the terminal device sees the content of the RAR. The content of RAR includes a medium access control (MAC) protocol data unit (PDU) which in turn carries at least as many subPDUs as the number of correctly detected preambles over the RO associated with the RA-RNTI. Indeed, when the network device scrambles physical downlink control channel (PDCCH) CRC with RA-RNTI for scheduling the transmission of PDSCH that carries RAR(s), RA-RNTI can be addressed to multiple terminal devices. For example, multiple terminal devices might decode PDCCH scrambled by the same RA-RNTI. As used herein, each subPDUs of the MAC PDU carries the RAPID of the corresponding correctly detected preamble, and the actual RAR content, e.g., the UL grant for Msg3, for the terminal device(s) who transmitted that preamble over the RO associated with the RA-RNTI.

PRACH repetitions (or also referred to as multiple PRACH transmissions in this application) will be specified for 5G NR. In one example, one RO group may be defined as a set of valid RO(s) to be used for performing a number of PRACH repetitions. Whether an RO is valid may be determined by using predefined rules.

For multiple PRACH transmissions, "RO group" is assumed for multiple PRACH transmissions with separate preamble on shared ROs and/or multiple PRACH transmissions on separate ROs. One RO group consists of valid RO(s) for a specific number of multiple PRACH transmissions.

As one example, all ROs in one RO group is associated with the same SSB(s). As another example, shared or separate RO/preamble means that the RO/preamble is shared or separated with single PRACH transmission.

In addition, whether to and how to address collision between valid ROs for multiple PRACH transmissions and other existing ROs for legacy single PRACH transmission or other features, e.g., 2-step RACH will be discussed.

With the definition of valid RO(s), additional validation rules may be used for ROs to be used for PRACH repetitions. Such additional validation rules may address collision between valid ROs for multiple PRACH transmissions and other existing ROs for legacy single PRACH transmission or other features, e.g., 2-step RACH. Particularly, in the case one RO of the RO group for PRACH repetitions occurs in the same time instance (but different frequency) of at least one other RO reserved for other applications, and the two ROs are mapped to different SSB indexes (i.e. different gNB beams), in some example embodiments where a gNB can have one beam active per time instance (e.g. some FR2 implementations with gNB capable of analogue-only beamforming) this would lead to the gNB being incapable of receiving preambles sent in both ROs. This is referred to also as SSB index collisions in this application. Specifically, if the gNB prioritizes the at least one other RO, the PRACH transmission on the RO for the PRACH repetitions would be lost. For this reason, the additional validation rule could be so that the PRACH transmission in the one RO of the RO group for PRACH repetitions occurring in the same time instance as the at least one other RO would be dropped and UE would transmit a lower number of PRACH repetitions.

In some mechanisms, for multiple PRACH transmissions, the RA-RNTI calculation is related to RAR window design. For example, several options for RA-RNTI calculation as follows:

Option 1: Multiple RA-RNTI candidates within one RAR window, i.e., UE attempts to detect a DCI format 1_0 with CRC scrambled by one of the multiple RA-RNTI candidates during a RAR window.

Option 2: Single RA-RNTI within one RAR window, i.e., UE attempts to detect a DCI format 1_0 with CRC scrambled by a corresponding RA-RNTI during a RAR window.

Option 2-1: The corresponding RA-RNTI is calculated based on RO for the last PRACH repetition.

Option 2-2: The corresponding RA-RNTI is calculated based on RO for the first PRACH repetitions.

Option 2-3: The corresponding RA-RNTI is calculated based on RO for a predefined PRACH repetitions except the last and first one.

Option 2-4: The corresponding RA-RNTI is calculated as a function of the sequence of ROs used for the multiple PRACH transmissions.

For Option 1, it indicates that UE should assume multiple RA-RNTIs candidates within one RAR window. This may happen for the case that multiple RAR windows are utilized and there is overlapping between RAR windows.

For Option 2, it indicates that UE only expects one RA-RNTI candidate within one RAR window, UE doesn't need to assume multiple candidates of RA-RNTI and UE will not increase the complexity on the reception of RAR. Option 2 is workable for single RAR window design.

In particular, option 2 targets definition of a single RA-RNTI for the group of RO. However, this leaves the open question of whether dropped ROs because of the SSB index collisions should be considered in the evaluation of the RA-RNTI, if applicable. For example, for Option 2-1, if the last PRACH repetition of a group of 4 repetitions is dropped, the last PRACH repetition becomes the third PRACH repetition in the group and so there is a need to define whether the RA-RNTI should be calculated based on the third or fourth RO. Similar examples can be found for Options 2-2, 2-3 and 2-4.

Several mechanisms for CBRA procedures have been described. However, these mechanisms need to be improved. On one hand, conditions for dropping of PRACH transmissions in case of collision of SSB indexes are necessary, and especially conditions on the time/frequency domain allocation of the colliding ROs and/or conditions on the colliding SSB indexes. On the other hand, it is also necessary to provide methods for calculation of the RA-RNTI in case the one or more ROs of the RO group that should be used for the calculation of the RA-RNTI is dropped.

Example embodiments of the present disclosure propose a scheme for RO dropping and for RA-RNTI calculation in the case of multiple PRACH transmissions. With this scheme, based on at least one condition being met, a device such as a UE determines that a PRACH transmission is to be dropped in a first RO of an RO group. Then, the device transmits at least one PRACH transmission other than the PRACH transmission to be dropped in ROs of the RO group. In the context of the present disclosure, if an RO is dropped, it means that no transmission occurs on the RO. If a PRACH transmission is dropped or to be dropped, it means that the PRACH is not transmitted.

In this way, multiple PRACH transmissions and a single PRACH transmission can be correctly received, even if they occur in the same time instance and are mapped to different SSB indexes. As said, SSB indexes are typically beamformed in different directions, so if a gNB is able to only beamform in one direction in one time instance, dropping of a PRACH transmission by the UE performing multiple PRACH transmissions allows gNB to beamform towards the UE performing a single PRACH transmission.

FIG. 1 illustrates an example communication environment 100 in which example embodiments of the present disclosure can be implemented. In the communication environment 100, a plurality of communication devices, including a first device 110 and a second device 120, can communicate with each other.

In the example of FIG. 1, the first device 110 may include a terminal device and the second device 120 may include a network device serving the terminal device. The serving area of the second device 120 may be called a cell 102.

It is to be understood that the number of devices and their connections shown in FIG. 1 are only for the purpose of illustration without suggesting any limitation. The communication environment 100 may include any suitable number of devices configured to implementing example embodiments of the present disclosure. Although not shown, it would be appreciated that one or more additional devices may be located in the cell 102, and one or more additional cells may be deployed in the communication environment 100. It is noted that although illustrated as a network device, the second device 120 may be another device than a network device. Although illustrated as a terminal device, the first device 110 may be a device other than a terminal device.

In the following, for the purpose of illustration, some example embodiments are described with the first device 110 operating as a terminal device and the second device 120 operating as a network device. However, in some example embodiments, operations described in connection with a terminal device may be implemented at a network device or other device, and operations described in connection with a network device may be implemented at a terminal device or other device.

In some example embodiments, if the first device 110 is a terminal device and the second device 120 is a network device, a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2A:
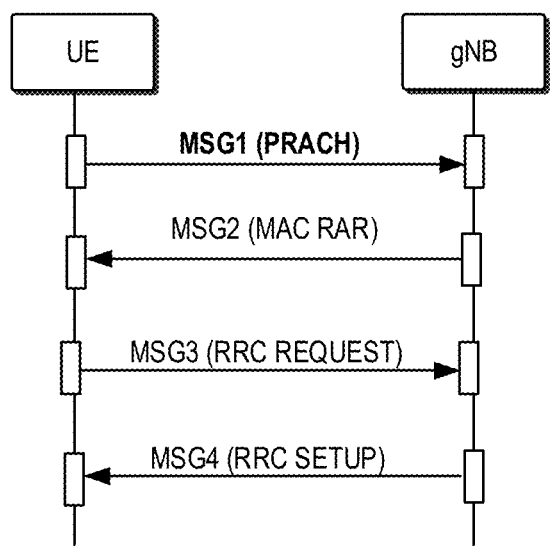
FIG. 2A illustrates a four-step random access channel (RACH) procedure.

As described above, several CBRA procedures are supported in 5G NR. FIG. 2A illustrates an example signaling diagram for a 4-step RACH procedure. As shown, a terminal device such as UE transmits a first message (referred to as Msg1) to a network device such as gNB. The first message comprises a specific preamble. The first message is transmitted by the UE via physical random-access channel (PRACH) using a specific resource called RACH occasion (RO).

In an example, the gNB transmits a second message (referred to as Msg2) to the UE. The second message comprises a random-access response (RAR) message such as a MAC RAR. The RAR includes a detected preamble ID, a time-advance command, a temporal cell (TC)-RNTI, and UL grant for the transmission of a third message (referred to as Msg3) on physical uplink shared channel (PUSCH).

The UE may transmit the third message (e.g., Msg3) to the gNB. The third message may be a RRC request. For example, the UE transmits Msg3 as a response to Msg2 over the scheduled PUSCH with an ID for contention resolution.

In an example, the gNB transmits a fourth message (referred to as Msg4) to the UE. The fourth message may be a RRC setup. The fourth message comprises a contention resolution message with the contention-resolution ID. In this way, the gNB transmits the contention resolution message with the contention-resolution ID.

Upon reception of Msg4, the UE may transmit an acknowledgement (ACK) on a physical uplink control channel (PUCCH) if its contention-resolution ID is carried by Msg4. The transmission of ACK completes the 4-step RACH. It is to be understood that prior to Msg1, there is also a preliminary step of transmitting and receiving the synchronization signal block (SSB), i.e., DL beam sweeping, which is not formally part of the RACH procedure. As a result of this preliminary step, the UE selects the index of the preferred SSB beam and decodes the associated physical broadcast channel (PBCH) for master information block (MIB), system information block (SIB), or the like. This index is also used by UE to identify a suitable RO for the preamble transmission (Msg1), according to the SSB-to-RO mapping implicitly conveyed by system information block type 1 (SIB1).

Similar to 4 step RACH presented above, the UE and gNB may perform a 2 step RACH. In the 2 step RACH, Msg1 and Msg3 may be combined in a MsgA and sent out without waiting for feedback from the UE in between (traditionally Msg2). Similarly, the gNB combines Msg2 and Msg4 into MsgB.

Figure 2B:
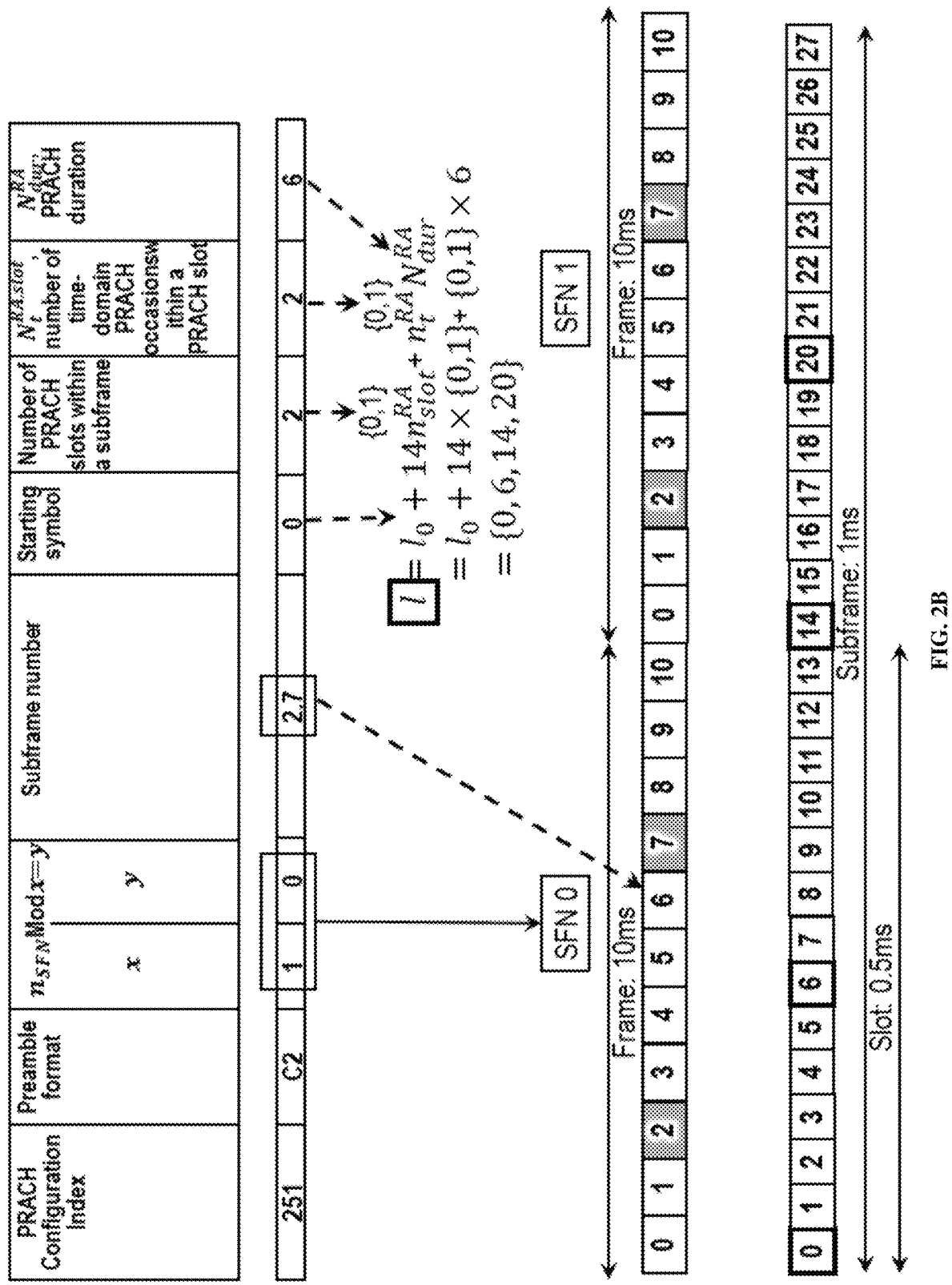
FIG. 2B illustrates an example of time-domain resource determination for RACH occasions.

As discussed, Msg1 is transmitted by the UE via PRACH using the RO. In some example embodiments, the time domain resource is RRC configured for the RO(s). FIG. 2B illustrates an example of time-domain resource determination for ROs. It is assumed that in embodiments described with respect to FIG. 2B, the prach-ConfigurationIndex is 251. As depicted, with this indicated index, the UE determines that a preamble format C2 should be used. The UE may further determine that ROs are allocated at the system frame numbers (SFNs) such as n_SFN. n_SFN satisfies n_SFN mod 1 being equal to 0 (i.e. all SFN numbers are valid). Alternatively, or in addition, in some example embodiments, the UE determines that within each of the determined SFNs, ROs are allocated at subframe number 2 and 7.

In addition, in some example embodiments, the UE determines that within each of the determined subframes, the remaining parameters in the considered row indicate that ROs will start at symbol number 0, 6, 14, 20. The symbol number is continuously counted regardless of the number of slots within the subframe, which depends on the sub-carrier spacing configured for PRACH.

The UE may further determine that ROs duration is 6 symbols (although the actual duration of the preamble format can be less than that).

In some example embodiments, the validity of the determined ROs need to be checked. An RO may be determined as valid, if it is within UL symbols or if it has a sufficient gap after the last SSB/DL symbol in case it is within flexible symbols.

Figure 2C:
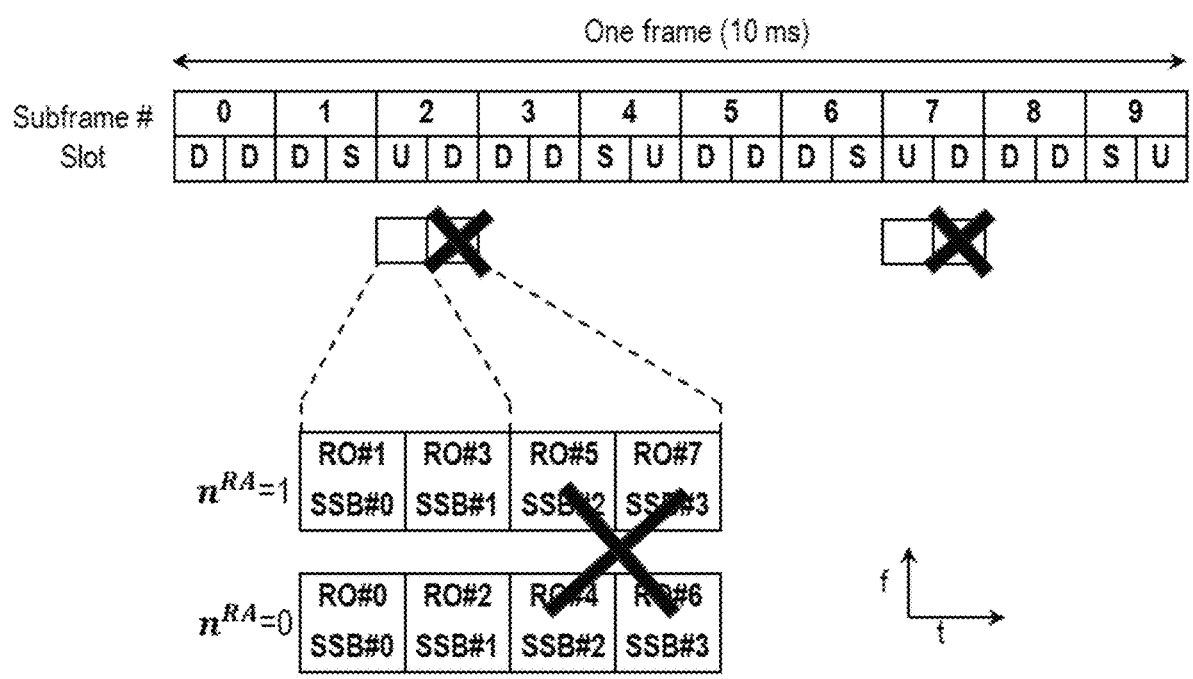
FIG. 2C illustrates an example of synchronization signal/physical broadcast channel block (SSB) to RACH occasion (RO) mapping.

In some example embodiments, the mapping of SSB indexes to the determined ROs may be configured. FIG. 2C illustrates an example of SSB to RO mapping. In the example of FIG. 2C, SSB to RO mapping is configured with prach-ConfigurationIndex 251 and UL/DL configuration DDDSU. As illustrated, valid ROs in one frame are determined. Additional configuration(s) may be configured. Examples of the additional configurations include but are not limited to: DDDSU slot structure, Msg1-frequency division multiplexing (FDM) being equal to two, and ssb-perRACH-OccasionAndCB-PreamblesPerSSB being one-half. Based on the configuration(s), two ROs are multiplexed in the frequency domain (Msg1-FDM equal to two) and any two FDM's ROs are mapped to the same SSB index (ssb-perRACH-OccasionAndCB-PreamblesPerSSB equal to ½).

In some example embodiments, UL coverage enhancements are provided. For example, multiple PRACH transmissions are performed with same beams for 4-step procedure. Alternatively, PRACH transmissions are performed with different beams for 4-step RACH procedure. As one example, enhancements of PRACH are targeting for frequency range two (FR2), and may also apply to frequency range one (FR1) when applicable. As another example, enhancements of PRACH are targeting short PRACH formats, and may also apply to other formats when applicable.

Figure 2D:
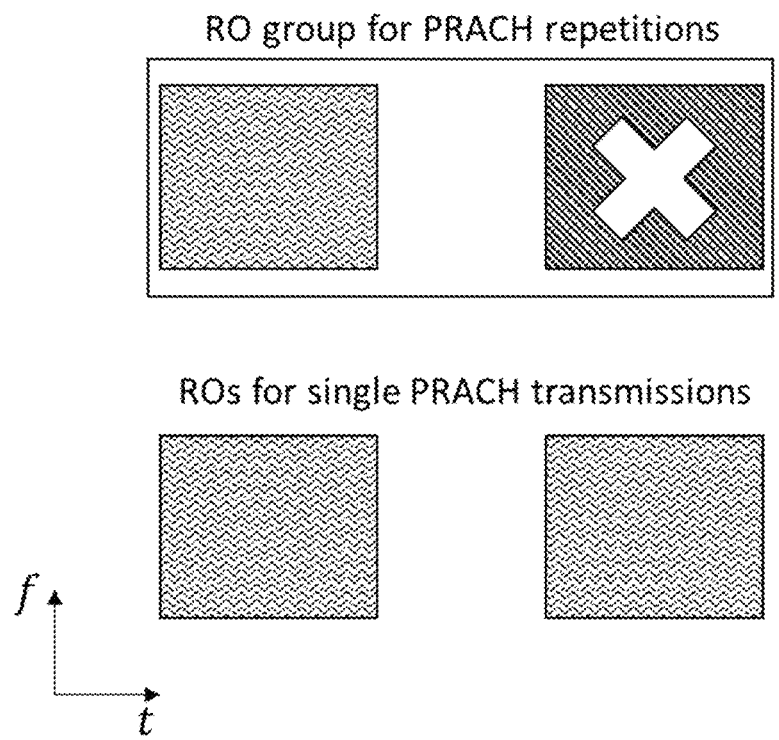
FIG. 2D illustrates an example of dropping of an RO in the RO group.

FIG. 2D illustrates an example of dropping of an RO in the RO group. In the example of FIG. 2D, a second RO in the RO group is to be dropped since the SSB index of such RO is different than the SSB index of the second RO of the ROs for single PRACH transmissions. SSB indexes in FIG. 2D are distinguished via different patterns.

As illustrated, the PRACH transmission in the second RO of the RO group for PRACH repetitions is dropped since the SSB index of such RO is different from the SSB index of the second RO for single PRACH transmission occurring in the same time instance. It is to be understood that the issue of FIG. 2D would occur when the two upper ROs are configured using different RACH configurations, e.g., 4-step and 2-step RACH, or additional RACH vs legacy RACH and so on.

As will be detailed below, some example embodiments of the present disclosure propose a solution for RO dropping and for RA-RNTI calculation at a terminal device. The proposed solution can be applied for multiple PRACH transmission. The proposed solution may also be applied for one RO of an RO group occurs in a same time instance but in different frequency locations of at least another RO. The at least another RO does not belong to the RO group and it is mapped to a different SSB index from the SSB index to which the RO of the group of ROs is mapped to.

Some example embodiments will be described in detail below with reference to FIGS. 3 to 5.

Figure 3:
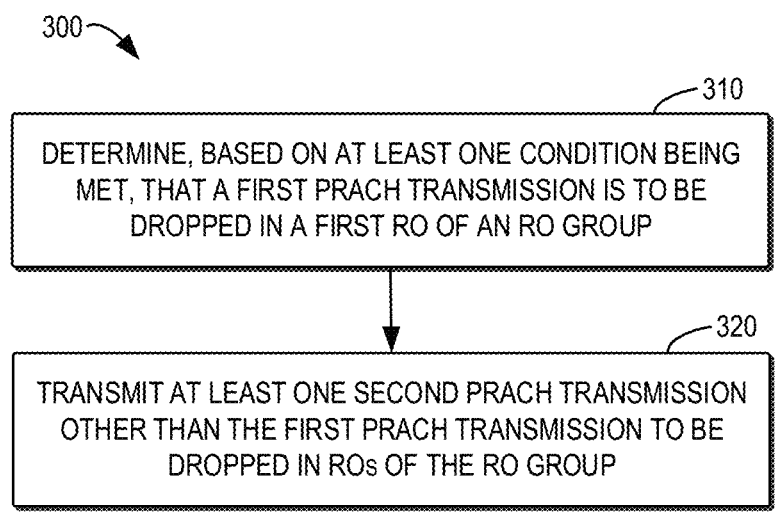
FIG. 3 illustrates a flowchart of a method implemented at a first device according to some example embodiments of the present disclosure.

FIG. 3 shows a flowchart of a method 300 implemented at a first device according to some example embodiments of the present disclosure. For the purpose of discussion, the method 300 will be described from the perspective of the first device 110 in FIG. 1.

At block 310, the first device 110 determines, based on at least one condition being met, that a first PRACH transmission is to be dropped in a first RACH occasion (RO) of an RO group. As used herein, the terms "first", "second" and the like may be used only for distinguishment between different elements with no intention of identifying their orders. As used herein, the term "RO group" may refer to a set of ROs to be used by the first device 110 for transmitting the PRACH repetitions.

As used herein, if the first device 110 determines that a PRACH transmission in an RO is to be dropped, the corresponding RO may be referred to as a "dropped RO".

The corresponding PRACH transmission may be referred to as a "dropped PRACH transmission". For example, the term "dropped RO" may refer to the RO for which the first device 110 determines to drop a corresponding PRACH transmission.

In some example embodiments, the RO group may be RRC configured. For example, time resources of the RO group may be determined or configured based on a procedure as described with respect to FIG. 2B. In addition, mapping of SSB indexes to the determined ROs in the RO group may be determined similar to the example mapping of FIG. 2C.

In some example embodiments, the at least one condition may comprise a first condition that the first RO fully overlaps in time with a second RO. The first and second ROs may be associated with different RACH configurations and may be located in different frequency locations. In some example embodiments, the first and second ROs may be mapped to different SSB indexes. If the first RO fully overlaps in time with the second RO of a different RACH configuration (for example, for single PRACH transmission), the first and second ROs mapped to different SSB indexes, the first condition is met.

In some example embodiments, the at least one condition may comprise a second condition that the first RO partially overlaps in time with the second RO. If the first RO partly overlaps in time with the second RO (and the first and second ROs mapped to different SSB indexes), the second condition is met.

As one example, if two configurations for the first and second ROs use two different PRACH configuration indices and the number of ROs per slot is not the same in the two "parallel" configurations, the first RO may partly overlap in time with the second RO in a number of OFDM symbols.

In some example embodiments, if the first RO overlaps in time with the second RO on at least a number of OFDM symbols, the second condition may be met. As an example, if the first device 110 determines that a number of OFDM symbol are shared by the first and second ROs, the first device 110 may determine that the second condition is met. For example, a number of OFDM symbols shared by two ROs may be considered as partially overlapping of the two ROs. For example, if a number of OFDM symbols are shared by two ROs, the second condition is met.

The number of OFDM symbols may be either predetermined by the first device or configured by the second device. As one example, the second device 120 may indicate the amount of overlap in number of OFDM symbols for which the first RO may be considered partially overlapped with the second RO.

In some example embodiments, the second device 120 may indicate the partial overlap between two ROs. For example, the second device 120 may transmit an indication to the first device 110. The indication indicates that the first RO partially overlaps in time with the second RO. For example, if a number of OFDM symbols is shared by two ROs which may be considered as partially overlapping, the second device 120 may indicate such partial overlapping to the first device 110. If the first device 110 receive the indication from the second device 120 indicative of the partial overlap, the first device 110 may determine that the second condition is met.

In some example embodiments, the at least one condition may comprise a third condition that the first RO occurs in the same slot as the second RO. For example, if the first RO occurs in the same slot as the second RO, even if the first and second ROs do not actually overlap in time (and if the first and second ROs are mapped to different SSB indexes), the third condition is met.

In some example embodiments, if the first, second or third condition is met, the first device 110 may determine whether the first RO has a lower priority than the second RO. If the first RO has a lower priority, the first device 110 may determine that the PRACH transmission is to be dropped in the first RO. As an example, ROs of the different RACH configurations are assigned different priority indexes. In case of collisions (i.e. first, second or third condition is met) of the first RO with the second RO, the first device 110 may determine the dropping based on priority assignment. For example, the first device 110 may drop the PRACH transmission corresponding to the RO with lower priority.

In some example embodiments, the first device 110 may determine whether the first RO or second RO has a lower priority based on the priority indexes of the first and second ROs. In some example embodiments, the priority indexes are predefined, or configured or indicated from the second device 120. For example, the priority indices of the ROs may be either explicitly configured or specified.

Alternatively, or in addition, in some example embodiments, the priority indexes may be determined based on SSB indexes associated with the first and second ROs. For example, the priority indexes of the ROs may be implicitly determined based on a list of prioritized SSB indexes such as a list of prioritized SSB SSB indexes. The list of prioritized SSB indexes or prioritized SSB beam indexes may be predefined. Alternatively, the list of prioritized SSB indexes or prioritized SSB beam indexes may be configured or indicated from the second device 120.

As one example, the first device 110 may determine the list of prioritized SSB indexes. The first device 110 may determine, based on the list of prioritized SSB indexes, priority levels of the SSB indexes associated with the first and second ROs. The first device 110 may determine the priority indexes based on the priority levels of the SSB indexes associated with the first and second ROs.

Alternatively, or in addition, in some example embodiments, the first device 110 may determine the priority indexes of the first and second ROs based on preamble indexes associated with the first and second ROs. The associated preamble indexes may be a list of prioritized preamble indexes with a configured or specified preamble format. The list of prioritized preamble indexes may be predefined. Alternatively, the list of prioritized preamble indexed may be configured or indicated from the second device 120.

As one example, the first device 110 determines the list of prioritized preamble indexes. The first device 110 may determine, based on the list of prioritized preamble indexes, priority levels of the preamble indexes associated with the first and second ROs. The first device 110 may determine the priority indexes based on the priority levels of the preamble indexes associated with the first and second ROs.

In some example embodiments, the at least one condition may comprise a fourth condition that the second device 120 is unable to simultaneously receive PRACH transmissions in the first RO and in the second RO, in the case the first RO and the second RO are associated to different synchronization signal block indexes and at least one of the first, second or third condition is met. For example, the second device 120 may have the capability or incapability of handling multiple SSB indexes in the same time instance. Even if the at least one condition is predetermined, the dropping may be further conditioned based on capability or incapability of the second device 120 for handling a plurality of SSB indexes in a same time instance. The capability information transmitted by the second device 120 to the first device 110 may comprise the indication of incapability of the second device 120. The capability information transmitted by the second device 120 to the first device 110 may comprise the indication of capability of the second device 120. In such cases, the first device 110 may determine the dropping of the first RO based on the capability indication.

In some example embodiments, the at least one condition may comprise a fifth condition on the SSB indexes associated with the first and second ROs, the first and second ROs overlapping in time based on the first, second or third condition. For example, the fifth condition may comprise a condition that predetermined pairs of SSB indexes are mapped to the first and second ROs. For example, the first device 110 may drop the PRACH transmission in case specific pairs of SSB indexes are mapped to the first and second ROs. For example, the fifth condition is met if specific pairs of SSB indexes are mapped to the first and second ROs.

In some example embodiments, the at least one condition may comprise a sixth condition on frequency allocation of the first and second ROs, the first and second ROs overlapping in time based on the first, second or third condition. As one example, the sixth condition may comprise a condition that the first and second ROs are spaced in frequency by a frequency distance equal to or lower than a threshold distance. If the first and second ROs are spaced in frequency by an amount lower than a threshold value, the fifth condition is met. In such situation, the first device 110 may drop the PRACH transmission.

Examples of the at least one condition have been described. In some example embodiments, at least one of the conditions is predetermined. Alternatively, or in addition, in some example embodiments, at least one of the conditions is configured or indicated from the second device 120. For example, at least one of the conditions may be indicated from the second device 120 to the first device 110 via high layer signaling. As used herein, the term "high layer" may also be referred to as "higher layer".

In some example embodiments, the second device 120 may transmit, to the first device 110, an indication of a trigger for at least one of the conditions to be effective. The first device 110 may receive the indication of the trigger. For example, the conditions may be predetermined and the second device 120 indicates the trigger for at least one of the conditions to be effective.

Examples of the at least one condition have been described. These conditions may be used separately, or in any suitable combinations. It is to be understood that the example conditions are only for the purpose of illustration, without suggesting any limitation. Any other suitable condition may be applied, and the scope of the present disclosure is not limited in this regard.

With these conditions, the first device 110 can make a better decision regarding dropping of PRACH transmission in an RO. Accordingly, PRACH transmissions can be dropped in case of collision of SSB indexes. Particularly, in cases wherein time or frequency domain allocation of the colliding ROs and/or colliding SSB indexes, the RO can be dropped, and thus PRACH transmissions can be dropped.

At block 320, the first device 110 transmits at least one second PRACH transmission other than the first PRACH transmission to be dropped in ROs of the RO group. As such, multiple RACH transmissions and a single RACH transmission can be correctly received.

In some example embodiment, the first device 110 may calculate a RA-RNTI based on one or more ROs in the RO group. As an example, the first device 110 may determine the one or more ROs of the RO group for calculation of the RA-RNTI. In one example, the one or more ROs used to calculate the RA-RNTI is predefined. In another example, the one or more ROs used to calculate the RA-RNTI may be configured or indicated from the second device 120. For example, which of the one or more ROs of the RO group are used for the RA-RNTI calculation may be based on a configuration or indication from the second device 120 via higher layer signalling.

In some example embodiments, the one or more ROs used to calculate the RA-RNTI are independent of the first RO. For example, whether the one or more ROs are used for the RA-RNTI calculation is independent of or not conditioned to whether the corresponding PRACH transmission over the one or more ROs is dropped, i.e. independent of or not conditioned to whether the at least one condition is met.

In some example embodiments, the one or more ROs used to calculate the RA-RNTI are associated with the first RO. For example, whether the one or more ROs are used for the RA-RNTI calculation is associated with or conditioned to whether the corresponding PRACH transmission over the one or more ROs is dropped.

In some example embodiments, the one or more ROs used to calculate the RA-RNTI may include the first RO. For example, a single RO such as the first RO is used for RA-RNTI calculation. In an example, the first RO may be retained as being a part of the one or more ROs used to calculate the RA-RNTI in the case the at least one condition is met. In another example, the first RO may not be retained as being a part of the one or more ROs used to calculate the RA-RNTI in the case the at least one condition is met.

Alternatively, in some example embodiments, the one or more ROs used to calculate the RA-RNTI may include an RO with a time distance to the first RO that is equal to or smaller than a threshold distance. The threshold distance is predefined or configured. For example, an RO closer in time to the first RO may be used for calculation of the RA-RNTI in the case the at least one condition is met. If a first distance between an RO previous to the first RO and a second distance between an RO next to the first RO are the same, either the RO previous to the first RO or the RO next to the first RO may be determined as an RO for calculating the RA-RNTI.

In some example embodiments, the one or more ROs may comprise one or more fallback ROs for calculation of the RA-RNTI. For example, the first device 110 determines, in the RO group, a fallback RO to calculate the RA-RNTI. In the RO group, the PRACH repetitions may be transmitted. For example, the fallback RO may be predefined. For another example, the fallback RO may be configured or indicated from the second device 120. As a particular example, the fallback RO may be the first RO of the RO group, whereas the last RO of an RO group is the one or more ROs used to calculate the RA-RNTI. If the at least one condition is met for the last RO, the RA-RNTI is calculated via the fallback RO. That, is, the fallback RO is used for RA-RNTI calculation.

Several examples of using a single RO for RA-RNTI calculation have been described above. In some example embodiments, a plurality of ROs may be used for RA-RNTI calculation. As one example, the first device 110 may determine, in the RO group, a plurality of ROs available for calculating the RA-RNTI. The plurality of ROs includes the first RO. The first device 110 may determine other ROs of the plurality of ROs than the first RO to calculate the RA-RNTI.

As another example, the one or more ROs for calculation of the RA-RNTI are all ROs in the RO group where the at least one condition is not met. For example, if an RO group is constituted of four ROs and all four ROs are to be used for RA-RNTI calculation (i.e. the four ROs are the one or more ROs for calculation of the RA-RNTI), but the PRACH transmission in the last RO of the four ROs is dropped (i.e. the at least one condition is met in the last RO), the one or more ROs for calculation of the RA-RNTI are the first three ROs of the group of four ROs. It is to be understood these above numbers of RO are only for the purpose of illustration, without suggesting any limitation.

In this way, the first device 110 can calculate the RA-RNTI by using one or more ROs. Thus, the RA-RNTI can be calculated even if the RO used to calculate the RA-RNTI is dropped. Accordingly, the second device 120 can correctly receive multiple PRACH transmissions and a single PRACH transmission. In addition, the first device 110 and the second device 120 can calculate RA-RNTI and arrive at the same calculation result. Furthermore, the first device 110 and the second device 120 can have a common understanding on which of the PRACH transmissions is dropped and so on which RO the at least one condition is met.

Example embodiments regarding the RO dropping and RA-RNTI calculation have been described with respect to FIG. 3. Further example embodiments will be described with respect to FIG. 4, which illustrates a signaling diagram 400 for RO dropping and RA-RNTI calculation according to some example embodiments of the present disclosure. For the purpose of discussion, the signaling diagram 400 will be described with reference to FIG. 1.

Figure 4:
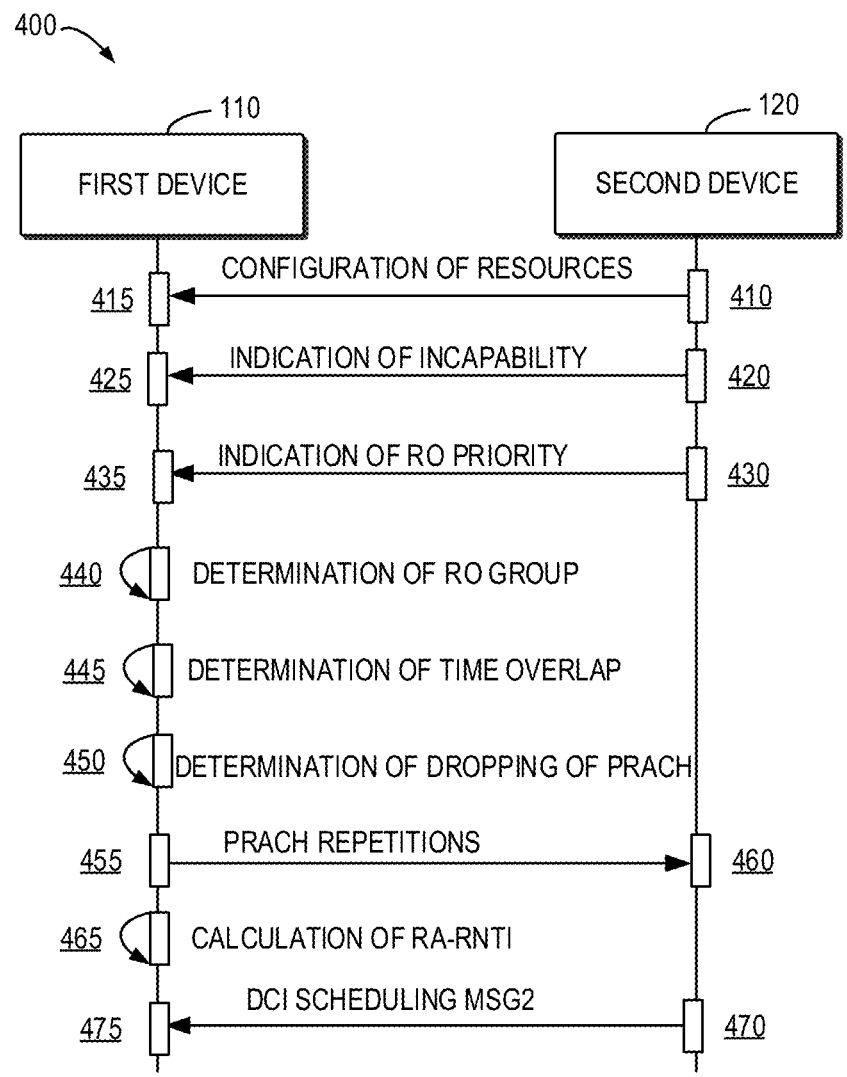
FIG. 4 illustrates a signaling diagram for RO dropping and Random Access Radio Network Temporary Identifier (RA-RNTI) calculation according to some example embodiments of the present disclosure.

In the description of FIG. 4, the CBRA procedure is illustrated as a 4-step RACH procedure. It is to be understood that example embodiments described with respect to the 4-step RACH procedure may be also applied to a 2-step RACH procedure. Scope of the present application is not limited in this regard.

As depicted, the second device 120 may transmit (410) a configuration of resources for PRACH repetitions to the first device 110. The first device 110 may receive (415) the configuration. For example, the configuration may be transmitted (410) via higher layer. The configuration may include parameters for determining or deriving the RACH occasions and preambles for transmission of the PRACH repetitions.

The second device 120 may transmit (420) an indication of incapability to the first device 110. The first device 110 may receive (425) the indication of incapability. The indication of incapability indicates that the second device 120 is incapable of handling a plurality of SSB indexes in a same time instance. It is to be understood that an indication of incapability is just for the sake of example, and a second device could also indicate a capability of handling a plurality of SSB indexes in a same time instance.

In some example embodiments, the indication of incapability may be capability information of the second device 120. For example, the capability information of the second device 120 may indicate that the second device 120 is incapable of handling multiple SSB indexes in the same time instance. By indicating of the incapability in the capability information, loss of generality of the incapability indication can be reduced.

Alternatively, or in addition, in some example embodiments, the indication of incapability may be implicitly conveyed by indicating nothing such as an empty field. The first device 110 may assume such incapability as a default behavior with nothing or an empty field indicated to the first device 110.

Such a capability indication or indication of incapability basically tells the first device 110 whether it has to drop a PRACH transmission in a certain RO, if the certain RO is frequency multiplexed in the same time instance with another RO mapped to a different SSB index, i.e. if the at least one condition is met in the certain RO. In this way, the first device 110 can decide whether to drop a PRACH transmission in the certain RO based on the capability indication or indication of incapability.

In some example embodiments, the second device 120 may transmit (430) an indication of RO priority to the first device 110. The first device 110 may receive (435) the indication of RO priority.

In the example of FIG. 4, it is assumed that the second device 120 indicates a secondary priority or a lower priority for the ROs for PRACH repetitions. For ROs for single PRACH transmissions, a first priority or a higher priority may be configured. Without loss of generality, the ROs for PRACH repetitions may be assigned with a first priority or high priority.

Alternatively, in some example embodiments, the priority may not be indicated by the second device 120 via signalling. Instead, the RO priority may be hardcoded in the specifications. For example, ROs for PRACH repetitions may be predefined or configured to have lower priority or higher priority.

The first device 110 may determine (440) an RO group based on the configuration received (415) from the second device 120. As used herein, the term "RO group" may refer to a set of ROs to be used by the first device 110 for transmitting the PRACH repetitions.

The first device 110 may determine (445) that an RO (referred to as a first RO) in the RO group overlaps in time with another RO (referred to as a second RO) mapped to a different SSB index than the SSB index to which the first RO is mapped.

In some example embodiments, the second RO and corresponding mapping may be determined by the first device 110 via an additional configuration of RACH resources. The additional configuration may be a configuration of RACH resources for single PRACH transmissions.

The first device 110 may determine (450) to drop the PRACH transmission in the first RO in the RO group if at least one condition is met. The first device 110 thus may drop the PRACH transmission in the first RO based on the determination. The at least one condition may be any suitable condition described with respect to FIG. 3, or any other suitable condition not described herein.

In some example embodiments, the dropping of PRACH transmission in the first RO is determined (450) based on the configuration or indication from the second device 120. For example, if the second device 120 indicates that the ROs for PRACH repetitions have a second priority or a lower priority, the first device 110 may drop the corresponding PRACH transmission.

Alternatively, in some example embodiments, priority for the ROs for PRACH repetition is either implicit or explicit (hardcoded) in the specifications. For example, overlapping ROs for PRACH repetitions may be dropped or retained, so that no configuration or indication is needed. In this way, signaling overhead can be reduced.

In some example embodiments, the first device 110 may transmit (455) PRACH repetitions to the second device 120 in the ROs of the RO group except the dropped RO. The second device 120 may receive (460) the PRACH repetitions. As used herein, the term "dropped RO" may refer to the RO for which the first device 110 determines to drop a corresponding PRACH transmission.

In some example embodiments, the first device 110 calculates (465) the RA-RNTI based on one or more ROs. As one example, the first device 110 may calculate (465) the RA-RNTI based on the dropped RO whose PRACH transmission is dropped. As another example, the first device 110 may calculate (465) the RA-RNTI based on more than one RO of the RO group to which the dropped RO belongs.

In some example embodiments, the second device 120 may transmit (470) DCI scheduling a subsequent Msg2 to the first device 110. The Msg2 may be CRC scrambled by the calculated (465) RA-RNTI. The first device 110 may receive (475) the DCI. The first device 110 may proceed with a RACH procedure based on the DCI. The RACH procedure may be a 4-step RACH procedure illustrated with respect to FIG. 2A. Alternatively, the RACH procedure may be a 2-step RACH procedure.

By using the RO dropping and RA-RNTI calculation according to the present disclosure, the second device 120 can correctly receive multiple PRACH transmissions and a single PRACH transmission.

Figure 5:
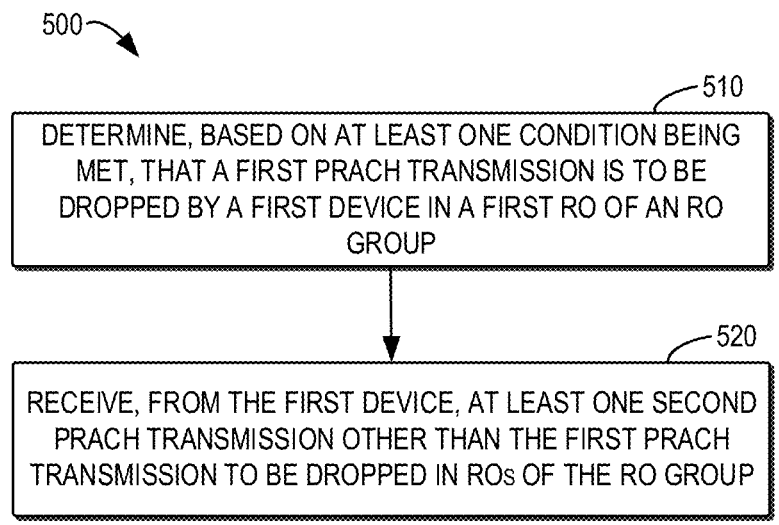
FIG. 5 illustrates a flowchart of a method implemented at a second device according to some example embodiments of the present disclosure.

FIG. 5 shows a flowchart of an example method 500 implemented at a second device in accordance with some example embodiments of the present disclosure. For the purpose of discussion, the method 500 will be described from the perspective of the second device 120 in FIG. 1.

At block 510, the second device 120 determines, based on at least one condition being met, that a first PRACH transmission is to be dropped by a first device in a first RO of an RO group.

At block 520, the second device 120 receives, from the first device 110, at least one second PRACH transmission other than the first PRACH transmission to be dropped in ROs of the RO group.

In some example embodiments, the at least one condition comprises at least one of: a first condition that the first RO fully overlaps in time with a second RO; a second condition that the first RO partially overlaps in time with the second RO; or a third condition that the first RO occurs in the same slot as the second RO.

In some example embodiments, the second device 120 may determine the first, second or third condition is met. Then, based on a determination that the first RO has a lower priority than the second RO, the second device 120 may determine that the PRACH transmission is to be dropped in the first RO.

In some example embodiments, determining that the first RO has a lower priority than the second RO may be based on priority indexes of the first and second RO.

In some example embodiments, the priority indexes may be predefined, or configured or indicated from the second device.

In some example embodiments, the second device 120 may that the first RO overlaps in time with the second RO on at least a number of OFDM symbols. Further, the second device 120 may determining that the second condition is met.

In some example embodiments, the number of OFDM symbols are either predetermined by the first device or configured by the second device.

In some example embodiments, the at least one condition comprises a fourth condition that the second device is unable to receive PRACH transmissions in the first RO and in the second RO, in the case the first RO and the second RO are associated to different synchronization signal block indexes and at least one of the first, second or third condition is met.

In some example embodiments, the at least one condition further comprises at least one of: a fifth condition on the synchronization signal block indexes associated with the first and second ROs, the first and second ROs overlapping in time based on the first, second or third condition; or a sixth condition on frequency allocation of the first and second ROs, the first and second ROs overlapping in time based on the first, second or third condition.

In some example embodiments, at least one of the first, second, third, fifth or sixth condition further requires that the first and second ROs are mapped to different synchronization signal block indexes.

In some example embodiments, the second device 120 may calculate a RA-RNTI based on one or more ROs of the RO group.

In some example embodiments, the second device 120 may determine the one or more ROs of the RO group for calculation of the RA-RNTI, the one or more ROs of the RO group including the first RO.

In some example embodiments, the first RO is retained as being a part of the one or more ROs in the case the at least one condition is met.

In some example embodiments, the first RO is not retained as being a part of the one or more ROs in the case the at least one condition is met.

In some example embodiments, the one or more ROs comprises one or more fallback ROs for calculation of the RA-RNTI.

By using the method 500, the second device 120 can also calculate the RA-RNTI and arrive at a same calculation result with the first device 110. Furthermore, the first device 110 and the second device 120 can have a common understanding on which of the PRACH transmissions is dropped.

Example Apparatus, Device and Medium

In some example embodiments, a first apparatus capable of performing any of the method 300 (for example, the first device 110 in FIG. 1) may comprise means for performing the respective operations of the method 300. The means may be implemented in any suitable form. For example, the means may be implemented in a circuitry or software module. The first apparatus may be implemented as or included in the first device 110 in FIG. 1.

In some example embodiments, the first apparatus comprises means for determining, based on at least one condition being met, that a Physical Random Access Channel (PRACH) transmission is to be dropped in a first Random Access Channel (RACH) occasion (RO) of an RO group; and means for transmitting at least one PRACH transmission other than the PRACH transmission to be dropped in ROs of the RO group.

In some example embodiments, the at least one condition comprises at least one of: a first condition that the first RO fully overlaps in time with a second RO; a second condition that the first RO partially overlaps in time with the second RO; or a third condition that the first RO occurs in the same slot as the second RO.

In some example embodiments, means for determining that the PRACH transmission is to be dropped in the first RO comprises: means for determining the first, second or third condition is met; and means for based on a determination that the first RO has a lower priority than the second RO, determining that the PRACH transmission is to be dropped in the first RO.

In some example embodiments, means for determining that the first RO has a lower priority than the second RO is based on priority indexes of the first and second RO.

In some example embodiments, the priority indexes are predefined, or configured or indicated from the second device.

In some example embodiments, the first apparatus further comprises: means for based on a determination that the first RO overlaps in time with the second RO on at least a number of OFDM symbols, determining that the second condition is met.

In some example embodiments, the first apparatus further comprises: the number of OFDM symbols are either predetermined by the first device or configured by the second device.

In some example embodiments, the at least one condition comprises a fourth condition that the second device is unable to receive PRACH transmissions in the first RO and in the second RO, in the case the first RO and the second RO are associated to different synchronization signal block indexes and at least one of the first, second or third condition is met.

In some example embodiments, the first apparatus further comprises: means for receiving, from a second device, an indication that the second device is incapable of handling a plurality of synchronization signal block indexes in a same time instance; and means for determining, based on the indication, that the fourth condition is met.

In some example embodiments, the at least one condition further comprises at least one of: a fifth condition on the synchronization signal block indexes associated with the first and second ROs, the first and second ROs overlapping in time based on the first, second or third condition; or a sixth condition on frequency allocation of the first and second ROs, the first and second ROs overlapping in time based on the first, second or third condition.

In some example embodiments, at least one of the first, second, third, fifth or sixth condition further requires that the first and second ROs are mapped to different synchronization signal block indexes.

In some example embodiments, the first apparatus further comprises: means for calculating a Random Access Radio Network Temporary Identifier (RA-RNTI) based on one or more ROs of the RO group.

In some example embodiments, the first apparatus further comprises: means for determining the one or more ROs of the RO group for calculation of the RA-RNTI, the one or more ROs of the RO group including the first RO.

In some example embodiments, the first RO is retained as being a part of the one or more ROs in the case the at least one condition is met.

In some example embodiments, the first RO is not retained as being a part of the one or more ROs in the case the at least one condition is met.

In some example embodiments, the one or more ROs comprises one or more fallback ROs for calculation of the RA-RNTI.

In some example embodiments, the first apparatus further comprises means for performing other operations in some example embodiments of the method 300 or the first device 110. In some example embodiments, the means comprises at least one processor; and at least one memory storing instructions that, when executed by the at least one processor, cause the performance of the first apparatus.

In some example embodiments, a second apparatus capable of performing any of the method 500 (for example, the second device 120 in FIG. 1) may comprise means for performing the respective operations of the method 500. The means may be implemented in any suitable form. For example, the means may be implemented in a circuitry or software module. The second apparatus may be implemented as or included in the second device 120 in FIG. 1.

In some example embodiments, the second apparatus comprises means for determining, based on at least one condition being met, that a Physical Random Access Channel (PRACH) transmission is to be dropped by a first device in a first Random Access Channel (RACH) occasion (RO) of an RO group; and means for receiving, from the first device, at least one PRACH transmission other than the PRACH transmission to be dropped in ROs of the RO group.

In some example embodiments, the at least one condition comprises at least one of: a first condition that the first RO fully overlaps in time with a second RO; a second condition that the first RO partially overlaps in time with the second RO; or a third condition that the first RO occurs in the same slot as the second RO.

In some example embodiments, means for determining that the PRACH transmission is to be dropped in the first RO comprises: means for determining the first, second or third condition is met; and means for based on a determination that the first RO has a lower priority than the second RO, determining that the PRACH transmission is to be dropped in the first RO.

In some example embodiments, means for determining that the first RO has a lower priority than the second RO is based on priority indexes of the first and second RO.

In some example embodiments, the priority indexes are predefined, or configured or indicated from the second device.

In some example embodiments, the second apparatus further comprises: means for based on a determination that the first RO overlaps in time with the second RO on at least a number of OFDM symbols, determining that the second condition is met.

In some example embodiments, the second apparatus further comprises: the number of OFDM symbols are either predetermined by the first device or configured by the second device.

In some example embodiments, the at least one condition comprises a fourth condition that the second device is unable to receive PRACH transmissions in the first RO and in the second RO, in the case the first RO and the second RO are associated to different synchronization signal block indexes and at least one of the first, second or third condition is met.

In some example embodiments, the second apparatus further comprises: means for transmitting, to the first device, an indication that the second device is incapable of handling a plurality of synchronization signal block indexes in a same time instance.

In some example embodiments, the at least one condition further comprises at least one of: a fifth condition on the synchronization signal block indexes associated with the first and second ROs, the first and second ROs overlapping in time based on the first, second or third condition; or a sixth condition on frequency allocation of the first and second ROs, the first and second ROs overlapping in time based on the first, second or third condition.

In some example embodiments, at least one of the first, second, third, fifth or sixth condition further requires that the first and second ROs are mapped to different synchronization signal block indexes.

In some example embodiments, the second apparatus further comprises: means for calculating a Random Access Radio Network Temporary Identifier (RA-RNTI) based on one or more ROs of the RO group.

In some example embodiments, the second apparatus further comprises: means for determining the one or more ROs of the RO group for calculation of the RA-RNTI, the one or more ROs of the RO group including the first RO.

In some example embodiments, the first RO is retained as being a part of the one or more ROs in the case the at least one condition is met.

In some example embodiments, the first RO is not retained as being a part of the one or more ROs in the case the at least one condition is met.

In some example embodiments, the one or more ROs comprises one or more fallback ROs for calculation of the RA-RNTI.

In some example embodiments, the second apparatus further comprises means for performing other operations in some example embodiments of the method 500 or the second device 120. In some example embodiments, the means comprises at least one processor; and at least one memory storing instructions that, when executed by the at least one processor, cause the performance of the second apparatus.

Figure 6:
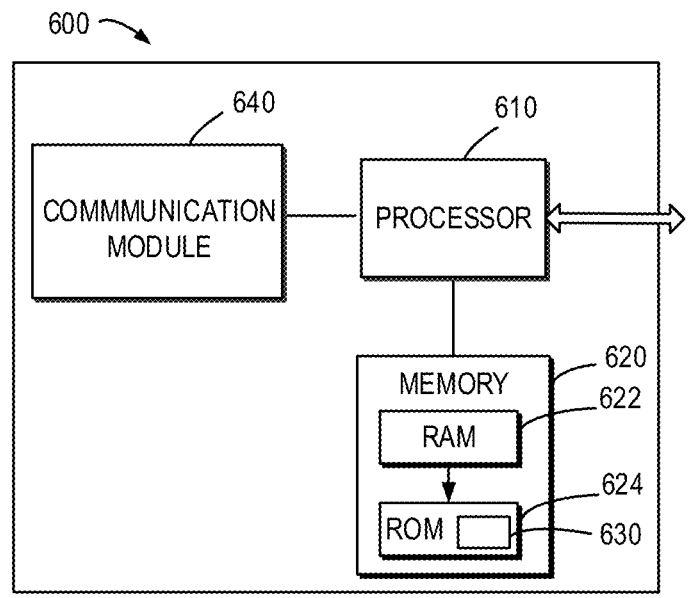
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 may be provided to implement a communication device, for example, the first device 110 or the second device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The instructions of the program 630 may include instructions for performing operations/acts of some example embodiments of the present disclosure. The program 630 may be stored in the memory, e.g., the ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIG. 3 to FIG. 5. The example embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 7:
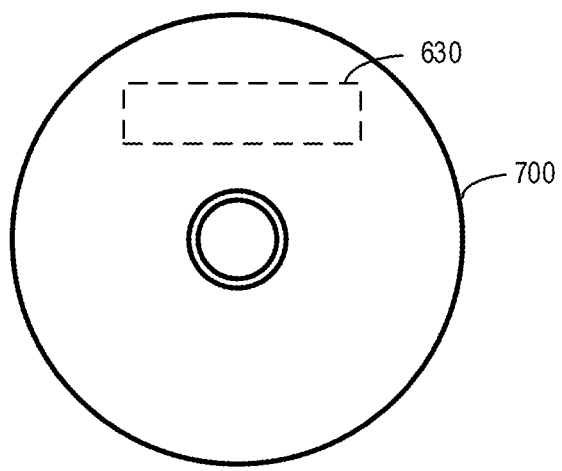
FIG. 7 illustrates a block diagram of an example computer readable medium in accordance with some example embodiments of the present disclosure.

FIG. 7 shows an example of the computer readable medium 700 which may be in form of CD, DVD or other optical storage disk. The computer readable medium 700 has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

The invention claimed is:

1. An apparatus, comprising:
   at least one processor; and
   at least one memory storing instructions that, when executed by the at least one processor, cause the apparatus at least to perform:
   determining a set of valid random access channel (RACH) occasions (ROs) for a physical random access channel (PRACH) transmission with preamble repetitions;
   determining that the PRACH transmission is to be dropped in at least one RO of the set of valid ROs;
   determining one or more ROs of the set of valid ROs for calculation of a random access radio network temporary identifier (RA-RNTI), wherein the one or more ROs for calculation of the RA-RNTI are not conditioned to whether the corresponding PRACH transmission over the one or more ROs is to be dropped; and
   calculating the RA-RNTI based on the determined one or more ROs of the set of valid ROs.

2. The apparatus of claim 1, wherein the one or more ROs for calculation of the RA-RNTI are predefined.

3. The apparatus of claim 1, wherein the one or more ROs used for calculation of the RA-RNTI are configured by higher layer signaling.

4. The apparatus of claim 1, wherein the one or more ROs for calculation of the RA-RNTI include the at least one RO.

5. The apparatus of claim 1, wherein the one or more ROs for calculation of the RA-RNTI include a last RO of the set of valid ROs.

6. The apparatus of claim 1, wherein the one or more ROs for calculation of the RA-RNTI include a RO with a time distance to the at least one RO, and the time distance is equal to or smaller than a threshold distance.

7. The apparatus of claim 1, wherein the at least one RO is retained in case the at least one RO being a part of the one or more ROs for calculation of the RA-RNTI.

8. The apparatus of claim 1, wherein the at least one RO is not retained in case the at least one RO being a part of the one or more ROs for calculation of the RA-RNTI.

9. The apparatus of claim 1, wherein the one or more ROs for calculation of the RA-RNTI comprises one or more fallback ROs.

10. The apparatus of claim 1, wherein determining that the PRACH transmission is to be dropped in the at least one RO based on at least one condition being met:
a first condition that the at least one RO fully overlaps in time with another RO;
a second condition that the at least one RO partially overlaps in time with the other RO; or
a third condition that the at least one RO occurs in a same slot as the other RO.

11. The apparatus of claim 1, wherein the apparatus comprises a terminal device or a network device.

12. A method comprising:
determining a set of valid random access channel (RACH) occasions (ROs) for a physical random access channel (PRACH) transmission with preamble repetitions;
determining that the PRACH transmission is to be dropped in at least one RO of the set of valid ROs;
determining one or more ROs of the set of valid ROs for calculation of a random access radio network temporary identifier (RA-RNTI), wherein the one or more ROs for calculation of the RA-RNTI are not conditioned to whether the corresponding PRACH transmission over the one or more ROs is to be dropped; and
calculating the RA-RNTI based on the determined one or more ROs of the set of valid ROs.

13. The method of claim 12, wherein the one or more ROs for calculation of the RA-RNTI are predefined.

14. The method of claim 12, wherein the one or more ROs used for calculation of the RA-RNTI are configured by higher layer signaling.

15. The method of claim 12, wherein the one or more ROs for calculation of the RA-RNTI include the at least one RO.

16. The method of claim 12, wherein the one or more ROs for calculation of the RA-RNTI include a last RO of the set of valid ROs.

17. The method of claim 12, wherein the at least one RO is retained in case the at least one RO being a part of the one or more ROs for calculation of the RA-RNTI.

18. The method of claim 12, wherein the at least one RO is not retained in case the at least one RO being a part of the one or more ROs for calculation of the RA-RNTI.

19. The method of claim 12, wherein determining that the PRACH transmission is to be dropped in the at least one RO based on at least one condition being met:
a first condition that the at least one RO fully overlaps in time with another RO;
a second condition that the at least one RO partially overlaps in time with the other RO; or
a third condition that the at least one RO occurs in a same slot as the other RO.

20. A non-transitory computer-readable medium comprising program instructions encoded thereon which, when executed by at least one processor, cause an apparatus to perform:
determining a set of valid random access channel (RACH) occasions (ROs) for a physical random access channel (PRACH) transmission with preamble repetitions;
determining that the PRACH transmission is to be dropped in at least one RO of the set of valid ROs;
determining one or more ROs of the set of valid ROs for calculation of a random access radio network temporary identifier (RA-RNTI), wherein the one or more ROs for calculation of the RA-RNTI are not conditioned to whether the corresponding PRACH transmission over the one or more ROs is to be dropped; and
calculating the RA-RNTI based on the determined one or more ROs of the set of valid ROs.

* * * * *